United States Patent [19]
Wicki et al.

[11] Patent Number: 6,003,064
[45] Date of Patent: *Dec. 14, 1999

[54] SYSTEM AND METHOD FOR CONTROLLING DATA TRANSMISSION BETWEEN NETWORK ELEMENTS

[75] Inventors: Thomas M. Wicki, Palo Alto, Calif.; Patrick J. Helland, Redmond, Wash.; Jeffrey D. Larson, San Jose, Calif.; Albert Mu, Milpitas, Calif.; Raghu Sastry, Santa Clara, Calif.; Richard L. Schober, Jr., Cupertino, Calif.

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/603,913

[22] Filed: Feb. 22, 1996

[51] Int. Cl.$^6$ .............................. G06F 13/12; G06F 13/14
[52] U.S. Cl. ........................ 709/200; 709/228; 709/237; 709/238
[58] Field of Search .................. 395/200.01, 200.02, 395/200.03, 200.05, 200.08, 200.09, 200.11, 200.13, 200.15, 250, 200.55, 200.62, 200.64–200.68, 200.71, 200.3–200.35, 200.54, 200.58; 370/211, 214, 401, 409, 229–232, 235–237; 709/200–201, 227–228, 234–238, 241–244, 248

[56] References Cited

U.S. PATENT DOCUMENTS

| | | | |
|---|---|---|---|
| 4,875,208 | 10/1989 | Furuhashi et al. | 370/400 |
| 4,975,905 | 12/1990 | Mann et al. | 370/409 |
| 5,315,580 | 5/1994 | Phaal | 370/232 |
| 5,473,755 | 12/1995 | Dunning | 711/100 |
| 5,491,801 | 2/1996 | Jain et al. | 709/241 |
| 5,513,321 | 4/1996 | Katori | 709/234 |
| 5,594,866 | 1/1997 | Nugent | 709/234 |
| 5,613,067 | 3/1997 | Brady et al. | 709/225 |
| 5,619,544 | 4/1997 | Lewis et al. | 710/105 |
| 5,790,398 | 8/1998 | Horie | 709/201 |

FOREIGN PATENT DOCUMENTS

| | | | |
|---|---|---|---|
| 0 282 198 | 9/1988 | European Pat. Off. | H04L 11/20 |
| 0 378 401 | 7/1990 | European Pat. Off. | G06F 13/42 |
| 0 380 856 | 8/1990 | European Pat. Off. | G06F 13/12 |

*Primary Examiner*—Zarni Maung
*Assistant Examiner*—Bharat Barot
*Attorney, Agent, or Firm*—Fenwick & West LLP

[57] ABSTRACT

A system and method for controlling data transmission between two network elements. A first port of a transmitting element is coupled to a second port of a receiving element. The second port includes buffers for temporarily storing received data until the data can be sent to another element. Included in the transmitting element are a received-currently-full register (RCFR), a sent-and-not-received register (SANRR), and a buffer-busy register (BBR). The transmitting element checks its BBR to determine if a buffer in the receiving element is available. The availability of buffers can be determined using a single priority protocol or a multiple priority protocol. If a buffer is available, the transmitting element transmits a data frame to the receiving element and sets the SANRR and the BBR to indicate that a frame has been sent (and that no acknowledgment has been received), that the selected buffer in the receiver is full, and that no additional data frames are to be sent to this buffer until the buffer is empty. When data is received by the receiving element, it is sent to an available buffer. When the data is received by the buffer, the receiving element sets a bit in a currently-full register (CFR) and a bit in a next-message-to-send register (NMTSR). A control signal is transmitted by the data receiving element on the same signal line as data that is being sent from the data receiving element to the data transmitting element. The data receiving element can multiplex the frames being sent in this direction with the control signal. When the transmitting element receives the control signal, it resets a bit associated with a buffer in the SANRR if the bit is set in the SANRR and if the associated bit in the NMTSR portion of the control signal is set.

28 Claims, 9 Drawing Sheets

| | | FLOW CONTROL RECEIVER 304A IN FIRST ROUTER 104A | FLOW CONTROL TRANSMITTER 305B IN SECOND ROUTER 104B | |
|---|---|---|---|---|
| FIGURE 9 (A) | RCFR | 1 1 1 1 1 1 | 0 0 0 0 0 0 | CFR |
| | SANRR | 0 0 0 0 0 0 | 0 0 0 0 0 0 | NMTSR |
| | BBR | 1 1 1 1 1 1 | | |
| FIGURE 9 (b) | RCFR | 0 0 0 0 0 0 | 0 0 0 0 0 0 | CFR |
| | SANRR | 0 0 0 0 0 0 | 0 0 0 0 0 0 | NMTSR |
| | BBR | 0 0 0 0 0 0 | | |
| FIGURE 9 (c) | RCFR | 0 0 0 0 0 0 | 0 0 0 0 0 0 | CFR |
| | SANRR | 1 0 0 0 0 0 | 0 0 0 0 0 0 | NMTSR |
| | BBR | 1 0 0 0 0 0 | | |
| FIGURE 9 (d) | RCFR | 0 0 0 0 0 0 | 1 0 0 0 0 0 | CFR |
| | SANRR | 1 0 0 0 0 0 | 1 0 0 0 0 0 | NMTSR |
| | BBR | 1 0 0 0 0 0 | | |
| FIGURE 9 (e) | RCFR | 1 0 0 0 0 0 | 0 0 0 0 0 0 | CFR |
| | SANRR | 1 0 0 0 0 0 | 1 0 0 0 0 0 | NMTSR |
| | BBR | 1 0 0 0 0 0 | | |
| FIGURE 9 (f) | RCFR | 1 0 0 0 0 0 | 0 0 0 0 0 0 | CFR |
| | SANRR | 0 0 0 0 0 0 | 0 0 0 0 0 0 | NMTSR |
| | BBR | 1 0 0 0 0 0 | | |
| FIGURE 9 (g) | RCFR | 0 0 0 0 0 0 | 0 0 0 0 0 0 | CFR |
| | SANRR | 0 0 0 0 0 0 | 0 0 0 0 0 0 | NMTSR |
| | BBR | 0 0 0 0 0 0 | | |

SYSTEM AND METHOD FOR CONTROLLING DATA TRANSMISSION BETWEEN NETWORK ELEMENTS

CROSS-REFERENCES TO RELATED APPLICATIONS

The subject matter of this application is related to the subject matter of the following applications:

application Ser. No. 08/605,677, attorney docket number 2268, entitled "ASYNCHRONOUS PACKET SWITCHING" filed on Feb. 22, 1996, by Thomas M. Wicki, Patrick J. Helland, Takeshi Shimizu, Wolf-Dietrich Weber, and Winfried W. Wilcke;

application Ser. No. 08/605,676, attorney docket number 2269, entitled "SYSTEM AND METHOD FOR DYNAMIC NETWORK TOPOLOGY EXPLORATION" filed on Feb. 22, 1996, by Thomas M. Wicki, Patrick J. Helland, Wolf-Dietrich Weber, and Winfried W. Wilcke, now U.S. Pat. No. 5,740,346;

application Ser. No. 08/603,926, attorney docket number 2270, entitled "LOW LATENCY, HIGH CLOCK FREQUENCY PLESIOASYNCHRONOUS PACKET-BASED CROSSBAR SWITCHING CHIP SYSTEM AND METHOD" filed on Feb. 22, 1996, by Thomas M. Wicki, Jeffrey D. Larson, Albert Mu, and Raghu Sastry, now U.S. Pat. No. 5,838,689;

application Ser. No. 08/603,880, attorney docket number 2271, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki, now U.S. Pat. No. 5,892,766;

application Ser. No. 08/604,920, attorney docket number 2272, entitled "CROSSBAR SWITCH AND METHOD WITH REDUCED VOLTAGE SWING AND NO INTERNAL BLOCKING DATA PATH" filed on Feb. 22, 1996, by Albert Mu and Jeffrey D. Larson;

application Ser. No. 08/603,911, attorney docket number 2275, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr., and Thomas M. Wicki, now U.S. Pat. No. 5,768,300;

application Ser. No. 08/603,923, attorney docket number 2277, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland and Takeshi Shimizu;

application Ser. No. 08/603,882, attorney docket number 2278, entitled "CLOCKED SENSE AMPLIFIER WITH POSITIVE SOURCE FEEDBACK" filed on Feb. 22, 1996, by Albert Mu, now U.S. Pat. No. 5,615,161; all of the above applications are incorporated herein by reference in their entirety.

BACKGROUND OF THE INVENTION

1. Field of the Invention

The present invention relates generally to the field of network data transmission, and more particularly to the field of distributed network transmission protocol systems and methods.

2. Description of Background Art

There are various techniques for efficiently and reliably transferring information between terminals (nodes) of a computer network. One such technique is packet switching. In packet switching, a transmitting (source) node sends a message to a (destination) receiving node. The message is divided into many variable-size portions. These portions are called packets. Each packet includes a data portion, a packet header, and, frequently, error detection information, e.g., parity information. The data portion includes the information in the message that is to be sent along with other protocol information from higher protocol layers in the network, e.g., the application layer, presentation layer, session layer, as set forth in the OSI reference model. The packet header includes information relating to, among other information, the location of the packet in the packet sequence.

In order to transport the packets between nodes of the network, additional information is required. This additional information is frequently stored in a frame header. A frame header is added to the packets and the combination of a packet and a frame header is called a frame. Each network limits the size of a frame, therefore, if the message is too large to fit in a single frame, the message will be separated into two or more frames. The information included in the frame header includes information identifying the ultimate destination node for the frame.

Frames are transmitted through the network using routers. For example, a frame can be transmitted from a first router to a second router, then from the second router to a third router, and then from the third router to the destination node. If the rate of incoming traffic at a first router is greater than the maximum frame transmission rate of the first router then a frame buffer in the first router will fill and, eventually, either the second router will instruct the first router to temporarily stop transmitting data or received frames will overwrite frames previously stored in the buffer and these overwritten frames will be lost. Most systems employ a transmission control system where the receiving router, e.g., the second router, can send a control signal to the transmitting router that instructs the transmitting router to temporarily stop transmitting.

Conventional transmission control systems utilize either a single signal line for both data frames and control signals or a dedicated control signal line. An example of a conventional transmission control system is an RS232 transmission protocol. In the RS232 transmission protocol a transmitting network element, e.g., a router, transmits frames to a receiving network element via a frame signal line. If the receiving router wants the transmitting router to stop transmitting frames, the receiving router generates a transmit off (XOFF) control signal and sends the control signal to the transmitting router via the frame signal line.

In high frequency networks, e.g., 500 MHz, the time necessary for the control signal to reach the transmitting router introduces a significant latency into the system. Specifically, if a control signal line is used to transport a control signal from the receiving router to the transmitting router, then the latency that is introduced is approximately equal to the time taken by a signal to travel the link distance between the transmitting router and the receiving router. If the link distance is approximately two meters (2 m), and the clock frequency is 500 MHz, where, for every clock cycle one data bit is sent on each signal line in the link, then approximately 3.3 bits (3.3 bits=500 MHz/300 km/s*2 m) are sent on each signal line by the transmitting router between the time that the receiving router sends the control signal and the time that the transmitting router receives the signal. In addition, the same number of bits are currently on the signal line, therefore approximately 6.6 bits are received by the receiving router after transmitting the XOFF control signal. If there are many signal lines on the link, e.g., 32, then approximately 212 bits (6.6 bits*32 signal lines) can be received by the receiving router after instructing the transmitting router to stop transmitting. These 212 bits must be stored in a buffer in the receiving router or else data will be lost. In order to store these bits, the receiving router must maintain extra buffers to capture all of these bits. Buffers are expensive and an inefficient use of buffers can have a significant impact on the performance of a network. Accordingly, setting aside enough buffer space to store at least 212 bits is an inefficient use of system resources. In the present example, 212 buffers spaces are reserved, and when the remaining buffer spaces in the receiving router are full, the receiving router transmits an XOFF control signal in order to ensure that all of the data that is sent by the data transmitting router between the transmission of the XOFF control signal by the data receiving router and the receipt of the XOFF control signal by the data transmitting router is captured and stored in a buffer space. However, not all of these bits are necessarily part of a data frame. Frequently, some of the bits are "idle" bits or other "garbage" bits that are sent over the network when no data frames or control signals are being transmitted. Accordingly, there is no need to store these idle bits. Therefore, when idle bits are transmitted, not all of the reserved buffer spaces are used. As described above, buffers are expensive and the RS232 transmission protocol is an inefficient use of these buffers.

When using the RS232 transmission protocol and a single control signal line, the transmitting router ceases data transmission after receiving the XOFF signal. When sufficient buffers become available in the receiving router, the receiving router generates a transmit-on (XON) signal and transmits the XON signal to the transmitting router. After receiving the XON signal the transmitting router will resume data transmission. However, this system introduces latency in the network that is equal to the time between sending the XON control signal and receiving the first data link.

If, instead of using a separate control signal line, the network uses a single data line for both control signals sent by the receiver and data frames sent by the transmitter, then the latency of the system further increases because the transmitting router must stop transmitting in order for the receiving router to transmit a control signal. Accordingly, a latency period that is approximately equal to the time required for a signal to travel from the transmitting router to the receiving router and back is introduced into the network.

What is needed is a flow control protocol system and method that: (1) efficiently utilizes the buffers in a receiving router; (2) minimizes network latency introduced by control signals; (3) can force the generation and transmission of a control signal; (4) multiplexes a control signal with other frames transmitted to the same port; (5) is robust, i.e., it can recover from transmission errors; (6) is adaptable to multiple priority level transmission frames; and (7) is adaptable to buffer resources provide in the receiver.

SUMMARY OF THE INVENTION

The invention is a system and method for controlling data transmission between two network elements. A first port of a transmitting element is coupled to a second port of a receiving element. The second port includes buffers for temporarily storing received data until the data can be sent to another element. The present invention includes a received-currently-full register (RCFR), a sent-and-not-received register (SANRR), and a buffer-busy register (BBR) in the sending element. The transmitting element checks its BBR to determine if a buffer in the receiving element is available. The availability of buffers can be determined using a single priority protocol or a multiple priority protocol. If a buffer is available, the transmitting element transmits a data frame to the receiving element and sets the SANRR and the BBR to indicate that a frame has been sent (and that no acknowledgment has been received), that the selected buffer in the receiver is full, and that no additional data frames are to be sent to this buffer until the buffer is empty.

When data is received by the receiving element, it is sent to an available buffer. When the data is received by the buffer, the receiving element sets a bit in a currently-full register (CFR) and a bit in a next-message-to-send register (NMTSR). Each bit is associated with the buffer. Each bit in the CFR indicates whether the associated buffer is empty. Each bit in the NMTSR indicates the value of the CFR register at the time the previous control signal was transmitted with the exception that if the CFR is not empty at any time between control signals, i.e., buffer status messages, then the NMTSR is set and will not be reset even if the buffer is empty when the control signal is transmitted. The control signal can include only the NMTSR or both the NMTSR and the CFR. The control signal is transmitted on the same signal line as data that is being sent from the data receiving element to the data transmitting element. The data receiving element can multiplex the frames being sent in this direction with the control signal.

When the transmitting element receives the control signal, it resets a bit associated with a buffer in the SANRR if the bit is set in the SANRR and if the associated bit in the NMTSR portion of the control signal is set. The value of the RCFR is set equal to either the value of the CFR or the NMTSR in the control signal. The transmitting element then sets the associated bit in the BBR equal to the logical OR of the SANRR and the RCFR. The transmitting element will send data only if a buffer is available at the receiving element as indicated by the BBR, subject to data priority restrictions, i.e., the transmitting element will not sent a frame to the buffer until the buffer is empty and the RCFR is cleared.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference numbers corresponds to the figure in which the reference number is first used.

The present invention is a flow control protocol system and method that: (1) efficiently utilizes the buffers in a receiving router; (2) minimizes network latency introduced by control signals; (3) can force the generation and transmission of a control signal; (4) multiplexes a control signal with other data frames transmitted to the same port; (5) is robust, i.e., it can recover from transmission errors; (6) is adaptable to multiple priority level transmission frames; and (7) is adaptable to buffer resources provide in the receiver.

Figure 1:
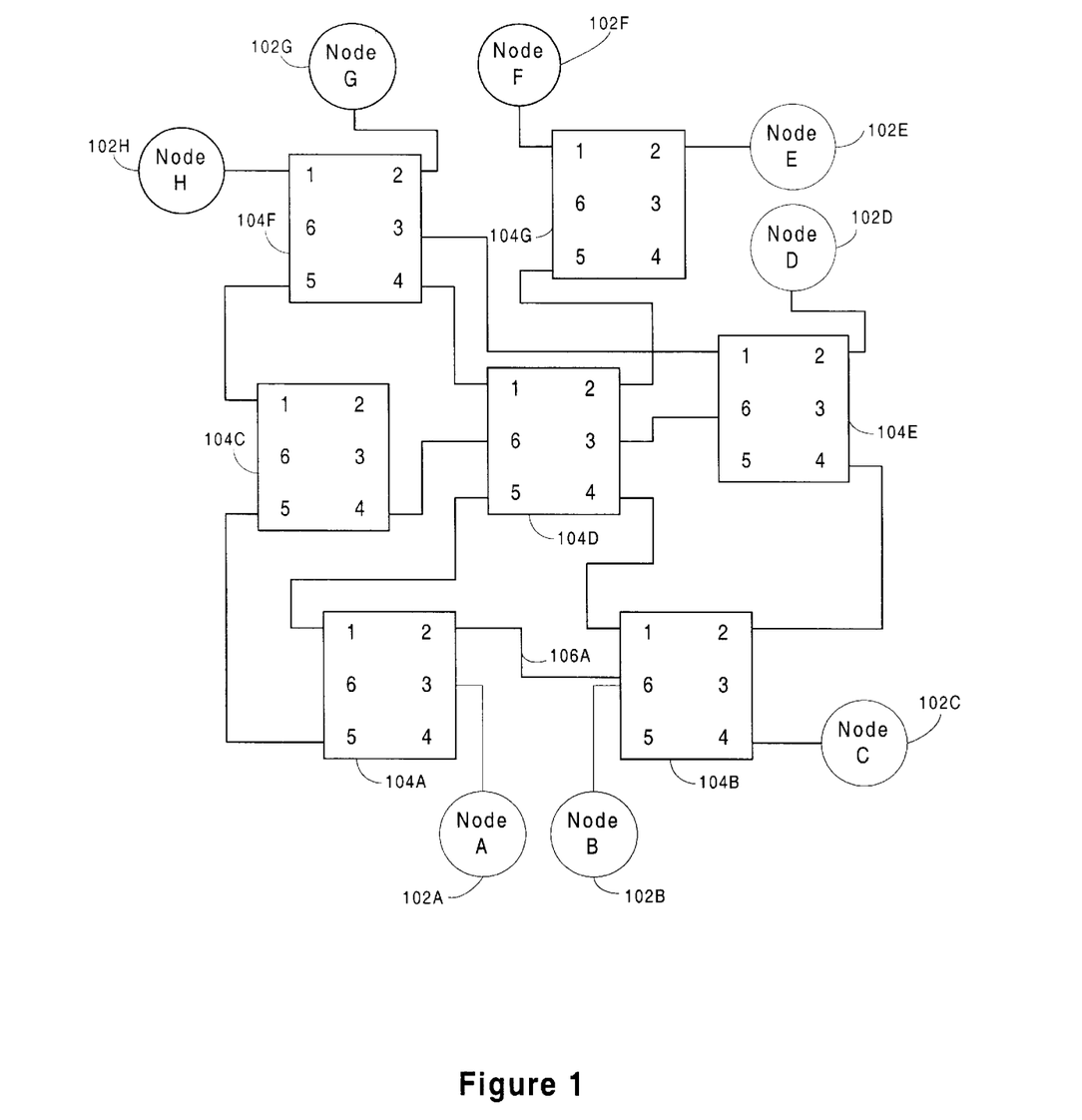
FIG. 1 is an illustration of a network including nodes, routers, and links according to a preferred embodiment of the present invention.

FIG. 1 is an illustration of a network including nodes, routers, and links according to a preferred embodiment of the present invention. The network illustrated in FIG. 1 includes eight nodes 102, i.e., Nodes A–H 102A–H, and seven routers 104A–G. In the preferred embodiment of the present invention the network is a distributed memory system. That is, the system has an architecture that is physically distributed but its memories (storage devices) are logically shared. For example, a node, e.g., 102D, can request access to a memory location that Node D 102D believes is local but is actually physically located at a different location and is coupled to a different node, e.g., Node A 102A. The requesting node (Node D 102D) identifies the location of the memory and the network quickly retrieves the data. In a distributed memory network an important performance parameter is the latency of the network. The latency of the network is the time required to provide a requesting node with the requested data as measured from the time at which the memory request is transmitted.

If Node D 102D requests data that is stored in Node A 102A, Node D 102D transmits a data request across the network. The data request will travel from, for example, Node D 102D to a third router 104E, to a second router 104B, to a first router 104A, and then to Node A 102A. The data will be retrieved from the storage device coupled to Node A 102A and sent across the network to Node D 102D. As described above, the data is sent in frames across the network. The node, e.g., Node A 102A, determines the routing path through the network and stores this routing information in the frame header of each frame. For example, the data being sent from Node A 102A to Node D 102D can have routing information directing each frame to travel from Node A 102A to the first router 104A, then from the first router 104A to the second router 104B, then from the second router 104B to the third router 104E, and then from the third router 104E to Node D 102D. Since the latency of the network is the duration between the requesting node sending a data request and the requesting node receiving the data, reducing the delay introduced by each of the routers 104 reduces the network latency. As described above, each router 104 includes buffers for temporarily storing the data that is received. In the preferred embodiment, there are six buffers per router port and there are six ports on a router. The size of each buffer is equal to the maximum frame length, e.g., 1292 bits. However, as described above, when designing a router 104, cost is an important consideration. Increasing the number of buffers in each router is expensive and in some situations is not feasible because of size constraints on an integrated circuit where the buffers reside.

The routers are connected to each other by duplex signal lines 106. Each duplex signal line 106A is capable of simultaneous transporting data in both directions, e.g., both from the second port of the first router 104A and to the second port of the first router 104A. The duplex signal line 106A is described in greater detail below with reference to FIG. 2.

Figure 2:
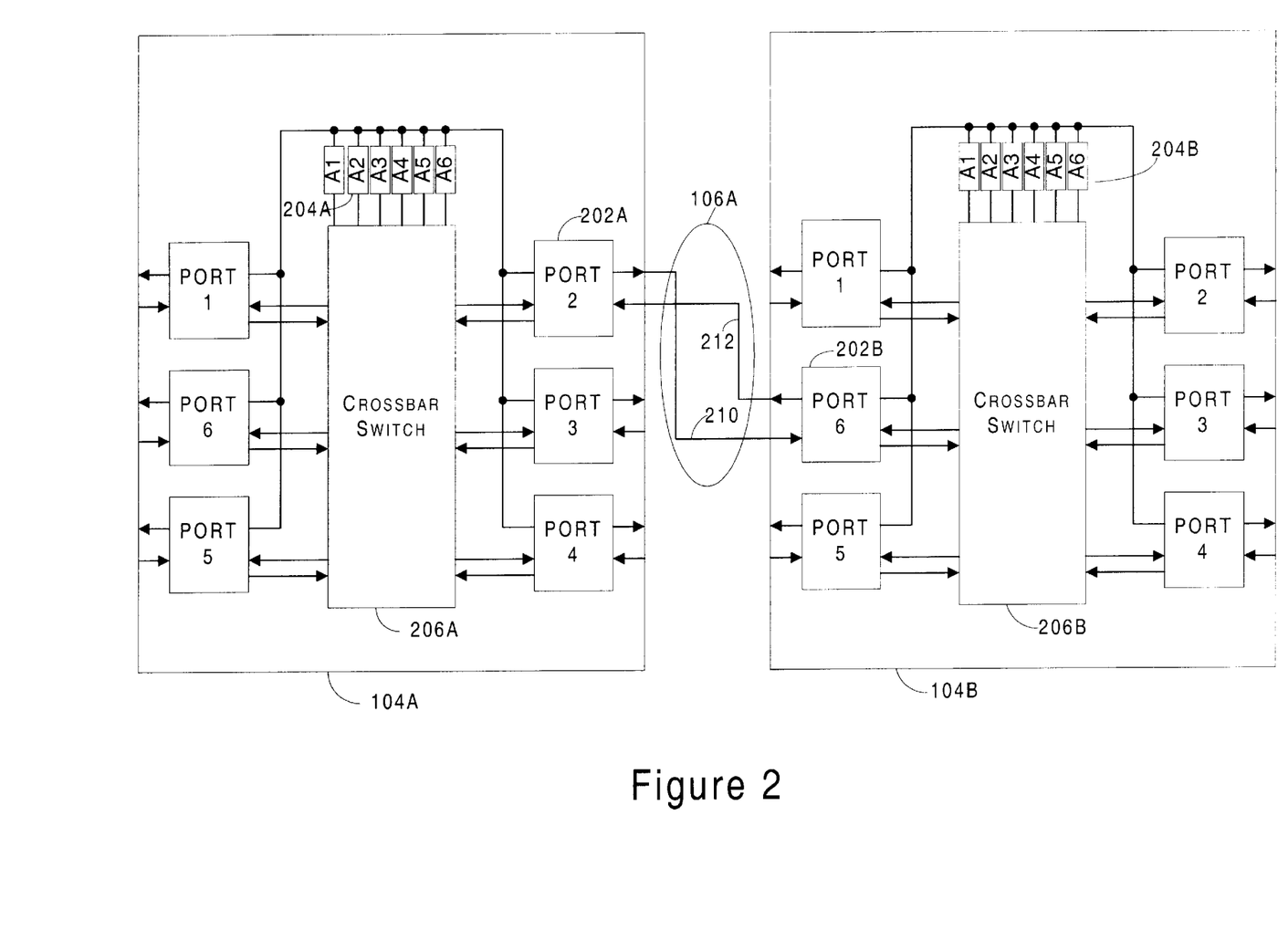
FIG. 2 is more detailed illustration of two routers in the network illustrated in FIG. 1, according to a preferred embodiment of the present invention.

FIG. 2 is more detailed illustration of two routers 104 in the network illustrated in FIG. 1, according to a preferred embodiment of the present invention. The duplex signal line 106A is represented by two signal lines 210, 212. Each signal line is uni-directional. A first signal line 210 transports information from port 2 202A of the first router 104A to port 6 202B of the second router 104B. A second signal line 212 transports information from port 6 202B of the second router 104B to port 2 202A of the first router 104A. In the preferred embodiment each illustrated signal line 210, 212 includes 43 signal lines that transport data between ports in parallel. Each router 104 includes six ports 202 that are each coupled to a crossbar switch 206. In addition, each port is connected to six arbiters 204, e.g., A1–A6, and each arbiter 204 is associated with an output portion of one of the ports. For example, arbiter 2 204A on the first router 104A is coupled to an output portion of port 2 202A. The output portion of port 2 202A is coupled to the signal line 210. As shown in FIG. 2, each port, e.g., port 2 202A of the first router 104A and port 6 202B of the second router 104B, is coupled to only one other port in a different router. For example, port 2 202A of the first router 104A is coupled to port 6 202B of the second router 104B, i.e., port 2 202A of the first router 104A only receives data from and only transmits data to port 6 202B of the second router 104B, and port 6 202B of the second router 104B only receives data from and transmits data to port 2 202A of the first router 104A. The operation of the arbiters 204, the crossbar switches 206 and the ports 202 are described in greater detail below with reference to FIGS. 3–9.

Figure 3:
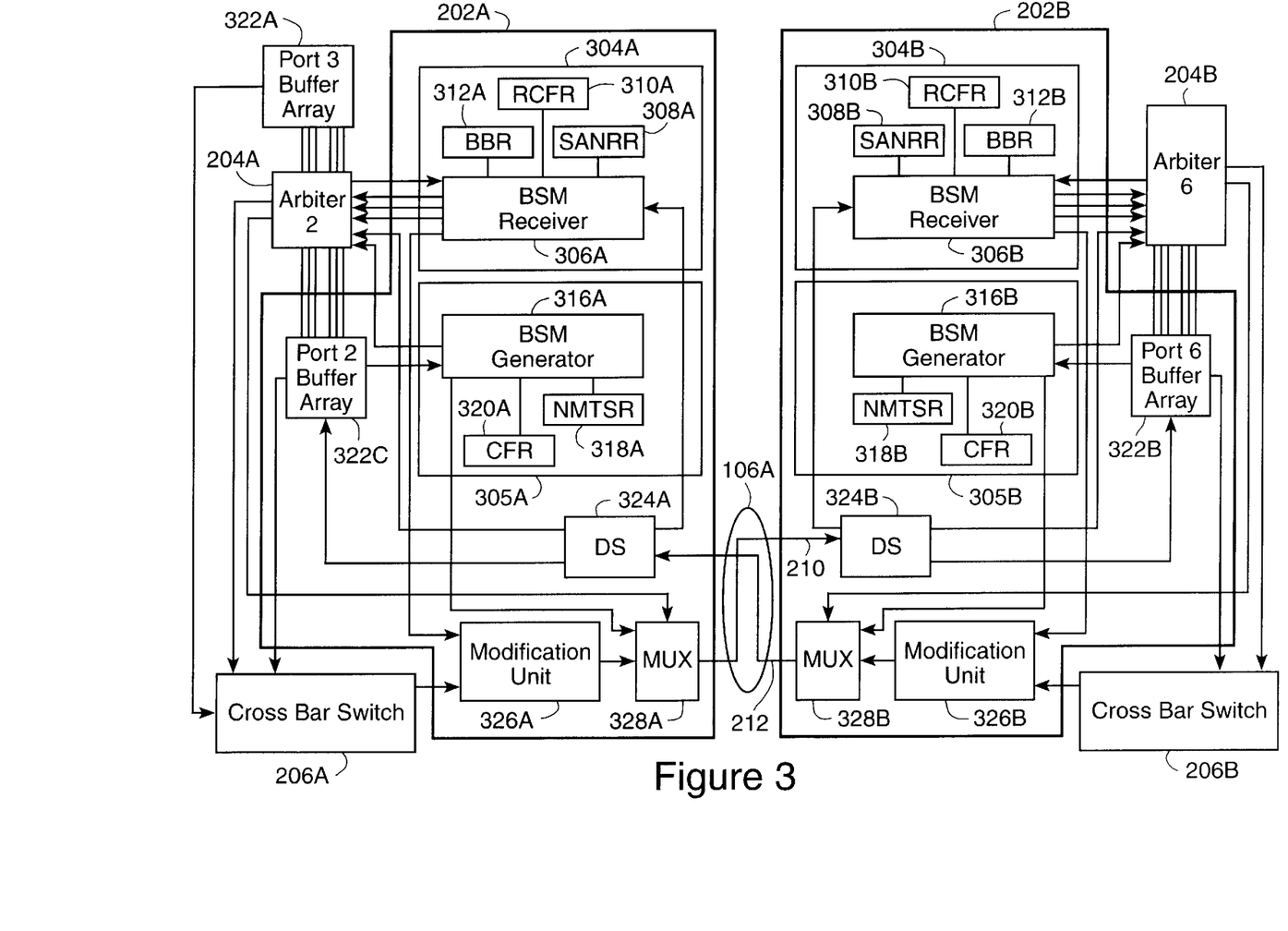
FIG. 3 is a more detailed illustration of the two routers illustrated in FIG. 2, according to a preferred embodiment of the present invention.

FIG. 3 is a more detailed illustration of the first router 104A and the second router 104B illustrated in FIGS. 1 and 2, according to a preferred embodiment of the present invention. Each port 202 in each router 104 includes a flow control receiver 304, a buffer array 322, a modification unit 326, a multiplexor (MUX) 328, a data synchronizer 324, and a flow control transmitter 305. Each flow control receiver 304 includes a buffer status message (BSM) receiver 306 that is connected to a sent-and-not-received register (SANRR) 308, a received-currently-full register (RCFR) 310, and a buffer-busy register (BBR) 312. Each flow control transmitter 305 includes a ESM generator 316 that is connected to a next-message-to-send register (NMTSR) 318 and a currently-full register (CFR) 320. Although described with reference to routers 104, each node 102 also includes the registers in the flow control receiver 304A and the flow control transmitter 305B. The operation of these port components is now described with reference to the data transfer example set forth above.

If Node D 102D requests data that is stored in a memory device that is controlled by Node A 102A, Node D 102D transmits a request to Node A 102A. Node A 102A retrieves the data, determines the route the data frames will take through the network, and stores this routing information in the header of each frame, as described above. The first router 104A receives data in the form of frames from Node A 102A. Node A 102A is coupled to port 3 of the first router 104A. Accordingly, each frame is sent to a buffer in the port 3 buffer array 322A. The routing information in the frame header identifies the next router 104 to which the data is to traverse through. In the present example, the next router is the second router 104B. Port 2 202A of the first router 104A is coupled to port 6 202B of the second router 104B. Accordingly, the routing information in the frame header identifies port 2 202A as the output port for the first router 104A. This output port information is received by the arbiter 204 associated with the output port. In the present example, arbiter 2 204A is associated with port 2 202A of the first router 104A. Arbiter 2 204A receives signals from the flow control receiver 304A indicating whether a data transfer to the receiving port can take place. In the present example, the receiving port is port 6 202B of the second router 104B. Arbiter 2 204A then transmits a signal to a first buffer in the port 3 buffer array 322A instructing the port 3 buffer array 322A to send the data in the first buffer to the crossbar matrix 206. Arbiter 2 204A also sends a signal to the crossbar matrix 206 causing the crossbar matrix 206 to couple the first buffer in the port 3 buffer array 322A to port 2 202A of the first router 104A. The operation of each arbiter 204 is described in greater detail in the co-pending patent application Ser. No. 08/603,880, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki, now U.S. Pat. No. 5,892,766, that was identified and incorporated by reference in its entirety above. Similarly, the operation of each crossbar matrix 206 is described in greater detail in the co-pending patent application Ser. No. 08/604,920, entitled "CROSSBAR SWITCH AND METHOD WITH REDUCED VOLTAGE SWING AND NO INTERNAL BLOCKING DATA PATH" filed on Feb. 22, 1996, by Albert Mu and Jeffrey D. Larson, that was identified and incorporated by reference in its entirety above.

Before sending the signal to arbiter 2 204A that indicates whether a data transfer to the receiving port (port 6 202B of the second router 104B) can take place, the flow control receiver 304A transmits a signal to the modification unit 326A identifying the address of an empty buffer (the receiving buffer) in the port 6 buffer array 322B. The BBR 312A in the flow control receiver 304A includes one bit for each buffer in the port 6 buffer array 322B of the second router 104B. The value of each bit in the BBR 312A indicates whether the first router 104A has determined that the associated buffer is empty in the port 6 buffer array 322B of the second router 104B. The technique for setting and resetting the bits in the BBR 312A is described below with reference to FIGS. 4–9. The modification unit 326A in the first router 104A receives the address of an empty buffer in the port 6 buffer array 322B in the second router 104B. This empty buffer is the receiving buffer.

When arbiter 2 204A instructs the crossbar switch 206A to connect the first buffer in the port 3 buffer array 322A to the modification unit 326, arbiter 2 204A also sends a signal to the flow control receiver 304A informing the flow control receiver 304A that a frame has been transmitted. The BSM receiver 306A in the flow control receiver 304A modifies the value of the bit in the SANRR 308A that is associated with the receiving buffer in the port 6 buffer array 322B to indicate that a frame has been sent to the receiving buffer and that the BSM receiver 306A has not received a signal acknowledging the receipt of the frame. As described below, the value of the BBR 312 is equal to the logical OR of the SANRR 308A and the RCFR 310A. Since the value of the bit associated with the receiving buffer in the port 6 buffer array 322B is set equal to a logical one, the associated bit in the BBR 312A is also set equal to a logical one. When this bit is equal to a logical one, the buffer address signal sent from the flow control receiver 304A to the modification unit 326A in the first router 104A will not identify the receiving buffer until this bit in the BBR 312A is reset, i.e., the receiving buffer is identified as "busy" until the BBR 312A is reset. If all of the buffers in the port 6 buffer array 322B are not empty as determined by the information in the most recent BSM or as determined by the flow control receiver 304A by setting the SANRR 308A and BBR 312A when the first router 104A transmits a frame to the second router, then all of the bits in the BBR 312A will be set equal to a logical one. In this situation, the BSM receiver 306A notifies arbiter 2 204A, and arbiter 2 204A will not permit the transmission of any additional frames to port 6 202B until at least one bit in the BBR 312A is reset. The above description describes the environment where only a single transport priority level exists for all frames. As described below, the present invention also supports frames having multiple transport priority levels.

The modification unit 326A receives the frame from the port 3 buffer array 322A via the crossbar switch 206A, and receives the receiving buffer address from the flow control receiver 304A. The modification unit 326A modifies the frame header by removing the routing information that identifies port 2 202A of the second router 104B and shifts the remaining routing information in the frame header, for example. The modification unit 326A also adds the receiving buffer address to the frame header. The modification unit 326A transmits the frame to the MUX 328A that transmits the frame to the second router 104B via signal line 210 of the duplex signal lines 106A.

A data synchronizer 324B in the second router 104B receives the data from port 2 202A of the first router 104A. Each router 104 includes a clock (not shown). One function of the data synchronizer 324B is to synchronize the received data with the internal clock of the second router 104B. Another function of the data synchronizer 324B is to distinguish between data frames and buffer status messages that are received from the first router 104A using a data/status control signal. After determining that the received frame is a data frame, the data synchronizer 324B transmits the data to the receiving buffer in the port 6 buffer array 322B. After receiving the frame header, the second router can begin transmitting the data to the third router 104E using the technique described above. However, if all of the buffers in the port 4 buffer array in the third router 104E are not empty, the second router 104B will continue storing the data received from the first router 104A in the port 6 buffer array 322B.

When data is received by the receiving buffer in the port 6 buffer array 322B, the BSM generator 316B in the BSM transmitter 305B is notified. The BSM generator 316B sets a bit in the NMTSR 318B, that is associated with the receiving buffer, equal to a logical one to indicate that a portion of the frame has been received by the receiving buffer. In addition, the BSM generator 316B sets an associated bit in the CFR 320B equal to a logical one to indicate that the receiving buffer is not empty. The BSM transmitter 305B generates and transmits a BSM. The contents of the BSM are described below with reference to FIGS. 4–9. The BSM includes an acknowledgment that the frame sent by the first router 104A was received, and also includes an indication of the status of the buffers in the port 6 buffer array, e.g., whether each buffer is empty. The BSM generator 316B transmits the data to an input port of the MUX 328B in the second router 104B. In addition, the BSM generator 316B can transmit a signal to arbiter 6 204B requesting that a BSM be sent to the first router 104A. Arbiter 6 204 generates a signal that controls the MUX 328B. When this signal is sent by arbiter 6 204B, the BSM is transmitted to port 2 202A of the first router 104A via signal line 212.

The data synchronizer 324A in port 2 202A receives the BSM. The data synchronizer 324A determines that the received data is a BSM and sends the data to the BSM receiver 306A in the flow control receiver 304A. The flow control receiver 304A updates the SANRR 308A, RCFR 310A, and BBR 312A based upon the received BSM. As described above, the bit values in these registers is received by the BSM receiver 306A. The BSM receiver 306A determines if any more frames can be sent to port 6 202B in the second router 104B. The operation of the flow control receiver 304A and the flow control transmitter 305B are described in greater detail below with reference to FIGS. 4–9.

Figure 4:
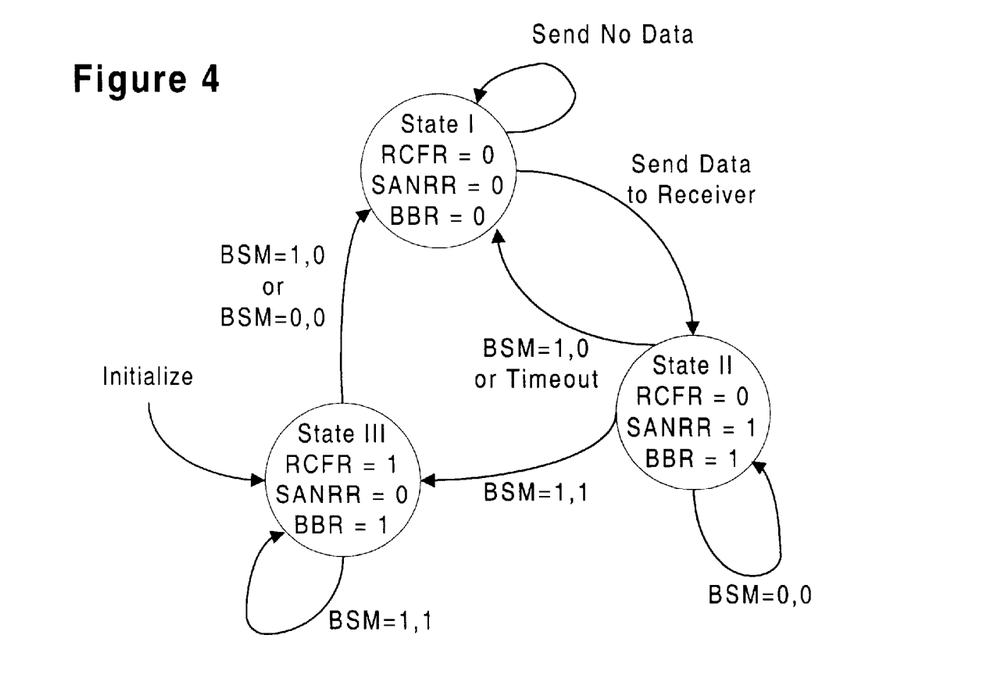
FIG. 4 is a state diagram illustrating the states of buffers in a data transmitting router in response to a buffer status message that includes values representing two registers in the data receiving router, according to a preferred embodiment of the present invention.
Figure 5:
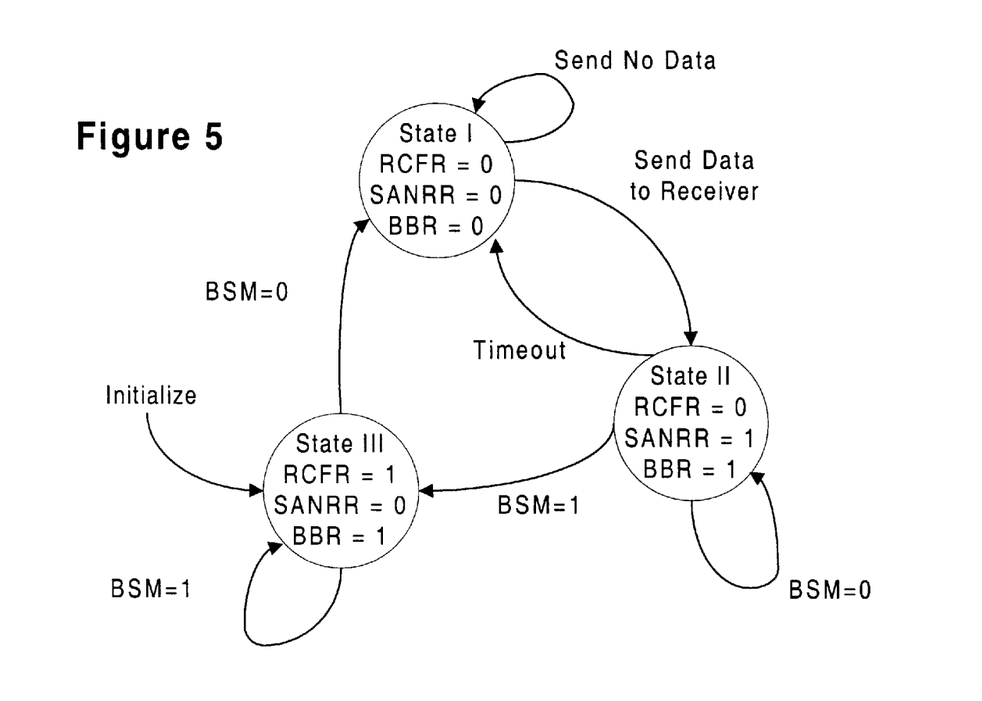
FIG. 5 is a state diagram illustrating the states of buffers in a data transmitting router in response to a buffer status message that includes values representing one register in the data receiving router, according to a second embodiment of the present invention.

FIG. 4 is a state diagram illustrating the states of buffers in the flow control receiver 304A in the first router 104A in response to a BSM that includes values representing both the NMTSR 318B and the CFR 320B in the flow control transmitter 305B in the second router 104B, according to a preferred embodiment of the present invention. A benefit of the flow control protocol of present invention is that it is robust. That is, the flow control protocol can recover from transmission errors, e.g., lost BSMs or lost data frames. When frames are transmitted from the first router 104A to the second router 104B, the flow control protocol of the present invention utilizes five registers. These registers are the SANRR 308A, RCFR 310A, and the BBR 312A in the flow control receiver 304A in the first router 104A, and the NMTSR 318B and CFR 320B in the flow control transmitter 305B in the second router 104B. The following description of the flow control protocol will reference these five registers. As described above, each of these five registers includes a bit associated with each buffer in the port 6 buffer array 322B. In the preferred embodiment, the port 6 buffer array 322B includes six buffers. FIG. 4 and FIG. 5 represent the state diagram for one bit in each of these five registers. Accordingly, the flow control protocol for a single buffer is now set forth.

When the network is initialized, the registers in the flow control receiver 304A are initialized to the values associated with state III. That is, RCFR=1, SANRR=0, and BBR=1. As described above, the BSM receiver 306A sets the value of the BBR 312A equal to the logical OR of the RCFR 310A and the SANRR 308A. The flow control receiver registers, i.e., SANRR 308A, RCFR 310A, and BBR 312A, are set to the values shown in state III because it is the most conservative flow control presumption. That is, when the flow control receiver registers are in state III, the flow control receiver 304A will prevent any data from being sent to port 6 202B of the second router 104B because when in state III, the BBR 312A is set equal to a logical one, indicating that the receiving buffer is not empty. As discussed below, if the receiving buffer is empty, the flow control protocol modifies the state of the flow control receiver registers to indicate the proper state. As described above, the BSM includes the bit values of the NMTSR 318B and the CFR 320B. For this example, a BSM=1,0 indicates that the bit in the NMTSR 318B that is associated with the receiving buffer has a value equal to a logical one, and that a bit in the CFR 320B that is associated with the receiving buffer has a value equal to a logical zero. After transitioning from state II to state III, there are only two permissible BSM values, i.e., BSM=1,1, and BSM=1,0. The reason for this is that the NMTSR 318B is equal to either: (1) the value of the CFR 320B transmitted in the previous BSM; or (2) a logical one for at least one BSM when a frame is received by the receiving buffer regardless of the value of the associated bit in the CFR 210B in the previous BSM. When in state III, the value of the CFR 320B in the last BSM is equal to a logical one, since the RCFR 310A stores this value. Accordingly, the value for the NMTSR 318B in the next BSM must be equal to a logical one based upon (1) and (2) above. However, if the registers are in state III as a result of an initialization procedure, a BSM=0,0 is valid and results in the registers in the flow control receiver 304A transitioning from state III to state I.

A BSM=1,1 indicates that the received buffer is not empty. Accordingly, if a BSM=1,1 is receiving by the flow control receiver 304A, the state of the registers in the flow control receiver 304A remain the same. A BSM=1,0 indicates that the frame has been received by the receiving buffer in the port 6 buffer array 322B, and transmitted to the third router 104E. Therefore, the receiving buffer is now empty. If a BSM=1,0 is received, the registers in the flow control receiver 304A transition from state III to state I.

In state I, the SANRR 308A, RCFR 310A, and the BBR 312A are all equal to a logical zero. Since the BBR 312A is equal to a logical zero, the flow control receiver 304A notifies arbiter 2 204A that the receiving buffer is empty. Subject to priority restrictions, discussed below, if a frame is available in port 3 202A to be transmitted to port 6 202B of the second router 104B, arbiter 2 204A instructs the crossbar matrix 206A to connect the transmitting buffer in the port 3 buffer array 322A to the modification unit 326A of port 2 202A. As described above, arbiter 2 204A also transmits a signal to the flow control receiver 304A informing the flow control receiver 304A that the data has been sent. At this time, the BSM receiver 306A sets the SANRR 308A equal to a logical one, and therefore sets the BBR 312B equal to a logical one. The RCFR 310A is not modified. Therefore, if data is transmitted to the second router 104B, the registers in the flow control receiver 304A transition to state II. If no data is sent while in state I, the registers in the flow control receiver 304A remain in state I.

In state II, the SANRR 308A and the BBR 312A are equal to a logical one, and the RCFR 310A is equal to a logical zero. In this state, the registers in the flow control receiver 304A indicate that a frame has been sent to the receiving buffer in the port 6 buffer array 322B but the flow control receiver 304A has not received an acknowledgment that the receiving buffer has received the frame, via a BSM. In addition, the RCFR 310A is equal to a logical zero indicating that based upon the most recent BSM, the receiving buffer is empty. When in state II, the flow control receiver 304A will not permit another frame to be sent to the receiving buffer. If a BSM=0,0 is received, the registers in the flow control receiver 304A remain in state II because the BSM indicates that no data was received in the receiving buffer since the previous BSM was transmitted. If a BSM=1,1 is received, the registers in the flow control receiver 304A transition to state III. A BSM=1,1 indicates that some frame data has been received by the receiving register and that the receiving register is not empty. Since some frame data has been received, the SANRR 308A is reset to a logical zero. Since the receiving buffer is not empty, the RCFR 310A is set to a logical one. A discussion of state III is provided above. If a BSM=1,0 is received, the registers in the flow control receiver 304A transition to state I. When in state II, a BSM=1,0 indicates that frame data has been received by the receiving buffer and that the frame has been transmitted to the third router 104E. Therefore, the receiving buffer is empty. Since the frame has been received by the receiving buffer, the SANRR 308A is reset. Since the receiving buffer is empty, the RCFR 310A remains equal to a logical zero. As described above, when in state I the flow control receiver 304A can instruct arbiter 2 204A to transmit a new frame to the receiving buffer in the port 6 buffer array 322B.

As stated above, the flow control protocol system and method of the present invention is robust. That is, the protocol can recover from transmission errors. A time-out feature of the flow control protocol enables the network to recover from BSM or frame transmission errors that could otherwise reduce the number of available buffers in the buffer arrays 322. If the registers in the flow control receiver 304A are in state II and the flow control transmitter 305B in the second router 104B generates, for example, a BSM=1,0, the registers in the flow control receiver 304A transition to state I and the receiving buffer is available to receive additional frames, as described above. However if this BSM is never received by the flow control receiver 304A then a problem occurs. The registers in the flow control receiver 304A are in state II, but the flow control transmitter 305B thinks that the registers in the flow control receiver 304A are in state I. That is, the flow control transmitter 305B generated and transmitted a BSM (BSM=1,0) indicating that the receiving buffer received the transmitted frame and that the receiving buffer is available to receive additional frames. Since the receiving buffer is empty and no new frames have been sent, the flow control transmitter 305B only generates BSMs equal to BSM=0,0. Since the registers in the flow control receiver 304A are in state II, a BSM=0,0 will not change the state of these registers. Accordingly, the flow control receiver 304A in the first router 104A will no longer use the receiving buffer. Similarly, if the frame that is transmitted from the first router 104A is never received by the second router 104B, the registers in the flow control receiver 304A are in state II, while the flow control transmitter 305B in the second router 104B will only generate BSMs equal to BSM=0,0, indicating that no frames have been received.

As described above, buffers are an expensive and precious resource. The loss of a single buffer reduces the efficiency of the network. The flow control protocol of the present invention introduces a time-out mechanism to prevent the loss of buffers. The time-out mechanism determines if a predetermined minimum amount of clock cycles have occurred while the registers in the flow control receiver 304A are in state II. If the registers are in state II for at least this minimum length of time then the flow control receiver 304A resets its registers to state I and increments an error counter (not shown) to identify that an error has occurred. One technique for determining if the predetermined number of clock cycles has occurred is to utilize a counter for each buffer in each buffer array 322. For example, if the counter expires for the receiving buffer, the flow control receiver 304A transitions its registers from state II to state I. However, the number of bits required for each counter can be approximately ten or eleven bits. Requiring each router 104 to have an eleven bit counter for each associated buffer increases the cost and decreases the potential performance of the routers 104. In the preferred embodiment up to 36 buffers can be associated with each router 104. The present invention solves the problem by using a single ten-bit counter for all buffers associated with a particular router, and then using only a onebit flag for each of the associated buffers. The ten-bit counter continually counts the clock cycles, when the ten-bit counter transitions, for example, from all logical ones to all logical zeros, the one-bit flag is set to a logical one for each buffer whose associated registers in the flow control receiver 104A are in state II. If the registers in the flow control receiver 104A change state, the one-bit flag is reset to a logical zero. However, if the state of the registers does not change by the next ten-bit counter transition to all logical zeros, a time-out will occur. As described above, when a time-out occurs the flow control receiver 104A transitions its registers to state I.

FIG. 5 is a state diagram illustrating the states of buffers in the flow control receiver 304A in the first router 104A in response to a BSM that includes values representing only the NMTSR 318B in the flow control transmitter 305B of the second router 104B, according to a second embodiment of the present invention. A discussion of how the flow control receiver 304A interprets state I, state II, and state III, is set forth above with reference to FIG. 4. If the BSM only represents the value in the NMTSR 318B, the flow control protocol of the present invention interprets the BSM differently than the situation where the BSM represents the values of both the NMTSR 318B and the CFR 320B. When the flow control receiver 304A is initialized, the registers in the flow control receiver 304A are set to the values indicated in state III. If the bit associated with the receiving register in the NMTSR 318B is equal to a logical one when the BSM was generated, then the BSM has a value equal to a logical one, i.e., BSM=1. A BSM=1 indicates that either (1) frame data has been received by the receiving buffer since the previous BSM was sent or (2) the receiving buffer was not empty at the time the previous BSM transmission, as represented by the CFR 320B. If a BSM=1 is received by the flow control receiver 304A when its registers are in state III, the state of these registers do not change. A BSM=0 indicates that the receiving buffer is empty. When a BSM=0 is received by the flow control receiver 304A, the state of its registers transition from state III to state I indicating that another frame can be sent to the receiving buffer.

The state of the registers in the flow control receivers 104A remains in state I until a frame is transmitted to the receiving buffer in the port 6 buffer array 322B. When a frame is transmitted, the state of the registers in the flow control receiver 104A transitions from state I to state II. If a BSM=0 is received while in state II, no change in state occurs. A BSM=0 indicates that no data was received by the receiving buffer since the transmission of the previous BSM. A BSM=1 is an acknowledgment that some frame data was received by the receiving buffer since the transmission of the previous BSM. Therefore, if a BSM=1 is received, the SANRR 308A is reset, because the frame was received by the receiving buffer. However, since the SANRR 308A must be set equal to 1 for at least one BSM after the receiving buffer receives data, no information as to whether the receiving buffer is empty at the time the BSM was sent can be discerned when a BSM=1 is received when the registers in the flow control receiver 304A are in state II. Accordingly, the associated bit in the SANRR 308A is reset and the associated bit in the RCFR 310A is set to a logical one. When the BSM represents only the NMTSR 318B, the registers in the flow control receiver 304A do not transition from state II to state I in response to a single BSM as was possible when the BSM represented both the NMTSR 318B and the CFR 320B. In order to transition from state II to state I when the BSM represents only the NMTSR 318B, the flow control receiver must receive at least two BSMs. The first BSM can transition the registers from state II to state III and the second BSM can transition the registers from state III to state I. However, the registers in the flow control receiver 304A can transition from state II to state I if a time-out event occurs. The time-out event is described above with respect to FIG. 4. The operation of the flow control protocol system and method is described in greater detail below with respect to FIGS. 6–9.

Figure 6A:
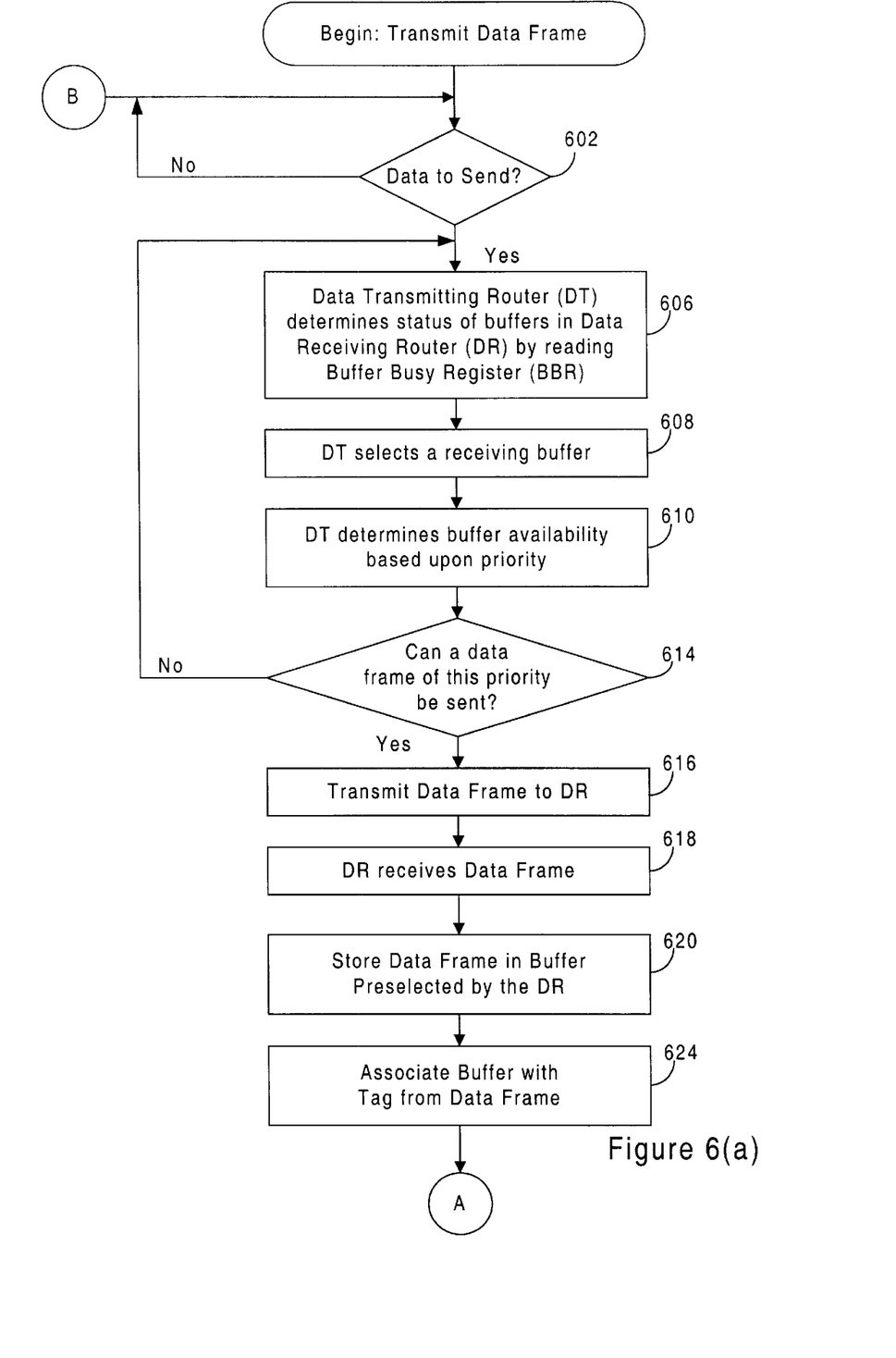
FIGS. 6(a)–6(b) are flow diagrams of the transmission protocol technique according to a preferred embodiment of the present invention.
Figure 6B:
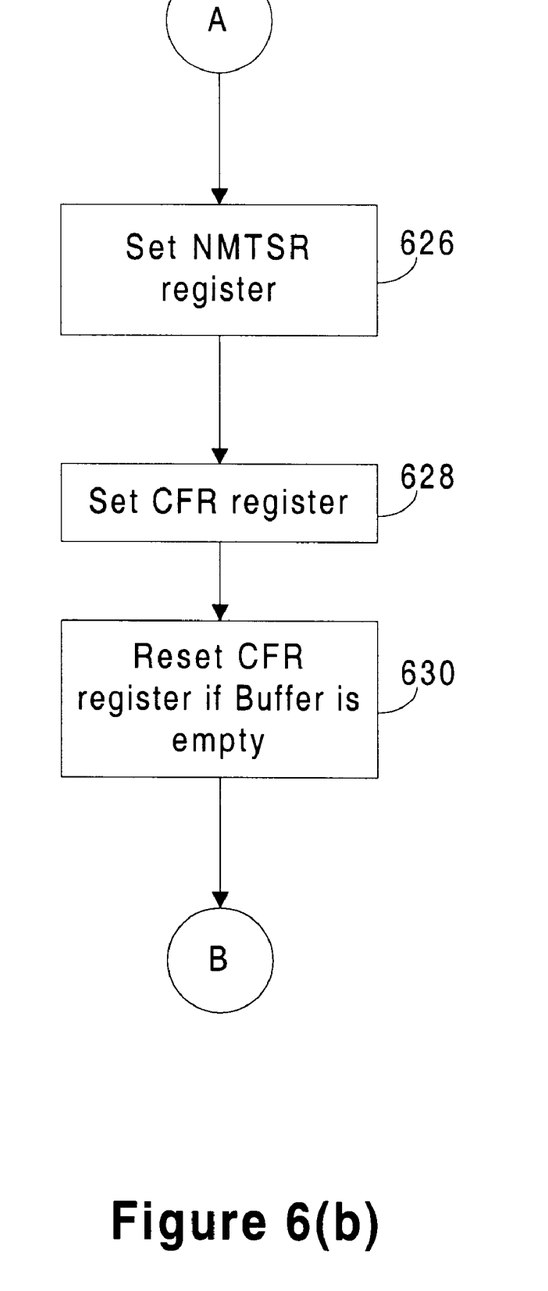

FIGS. 6(a)–6(b) are flow diagrams of the flow control protocol for transmitting a frame from the first router 104A to the second router 104B according to a preferred embodiment of the present invention. Arbiter 2 204A determines 602 if there is any data to be sent to port 6 202B of the second router 104B via port 2 202A of the first router 104A. After determining 602 that there is data to be sent, arbiter 2 204A checks the frame header to determine the priority of the frame. In the preferred embodiment, each frame has one of three priorities, e.g., low, medium, or high priority. The flow control receiver 304A in the first router 104A determines 606 the number of empty buffers in the port 6 buffer array 322B. In one priority protocol example, if only one buffer is empty, the flow control receiver selects 608 this buffer as the receiving buffer, and sends the address for the receiving buffer to the modification unit 326A as described above. The flow control receiver 304A determines 610 what frame priority is required in order to transmit a frame from the first router 104A to the second router 104B. For example, if at least one buffer is empty in the port 6 buffer array, the flow control receiver 304A transmits a signal to arbiter 2 on a high priority signal line indicating that a high priority frame can be transmitted to port 6 202B. If at least two buffers are empty in the port 6 buffer array, the flow control receiver 304A transmits a signal to arbiter 2 on the high priority signal line and a medium priority signal line indicating that a high priority frame or a medium priority frame can be transmitted to port 6 202B. If at least three buffers are empty in the port 6 buffer array, the flow control receiver 304A transmits a signal to arbiter 2 on the high priority signal line, the medium priority signal line, and a low priority signal line indicating that a high priority frame, a medium priority frame, or a low priority frame can be transmitted to port 6 202B.

Arbiter 2 compares the frame priority in the frame header with the value of the signal received on the associated priority signal lines to determine 614 if the frame has sufficient priority to be transmitted. If the priority signal line indicates that the frame cannot be transmitted, the frame will remain in the port 3 buffer array 322A until such time as the frame can be transmitted. If the priority signal line indicates that the frame can be transmitted, the frame is transmitted 616 to port 6 202B of the second router 104B in the manner described above.

The second router 104B receives 618 the frame. After the data synchronizer 324B determines that it is a data frame, the data synchronizer 324B stores 620 the frame in the receiving buffer. The data synchronizer sends the data to the port 6 buffer array 322B. In order to determine which buffer in the port 6 buffer array 322B is the receiving buffer, port 6 buffer array 322B can read the buffer address in the frame header and then multiplex the frame to the buffer whose address is in the frame header. In another technique, the port 6 buffer array 322B selects the receiving buffer before the frame is received. When the frame is received it is immediately sent to the predetermined receiving buffer. The buffer address in the frame header is a buffer tag and is associated 624 with the actual buffer address. When the BSM is generated, the bits in the NMTSR 318B and the CFR 320B will correspond to the buffer tag address of the buffer in the port 6 buffer array 322B instead of the actual buffer address. For example, if the flow control receiver 304A selects buffer 1 having an address equal to 001 as the receiving buffer, this address is stored in the frame header. When this frame is transmitted to the second router 104B, the data synchronizer 324B sends the frame to the port 6 buffer array 322B. The port 6 buffer array 322B may have selected buffer 3, having address 011, as the receiving buffer. The data in the frame is stored in buffer 3. However, when the BSM generator 316B stores the NMTSR 318B and the CFR 320B, the status of the buffer is stored in the bit position corresponding to the tag address, i.e., 0.01. Accordingly, when the BSM is received by the flow control receiver 304A in the first router 104A, the NMTSR 318B values and the CFR 320B values in the BSM correspond to the tag value generated by the BSM receiver 306A.

In the preferred embodiment, the entire frame is not stored in the receiving buffer unless the frame cannot be forwarded to the third router 104E. This virtual-cut-through-routing technique is achieved by having all routing information in the frame header. Therefore, once the second router 104B receives the frame header, the output port in the second router 104B that is connected to the third router 104E is known, e.g., port 2, and the second router 104B can begin transmitting the frame header to the third router 104E before the second router 104B receives the entire frame body.

After the receiving buffer receives a portion of the frame, the flow control transmitter 305B in the second router 104B sends the status of the receiving buffer to the BSM generator 316B. If the receiving buffer was empty when the previous BSM was generated and data is received at the receiving buffer, then the associated bit in the NMTSR 318B is set 626 equal to a logical one. As described above, the bit in the NMTSR 318B will remain equal to a logical one for at least one BSM in order to serve as an acknowledgment that the frame has been received by the second router 104B. In addition, when the receiving buffer is not empty, the CFR 320B is also set 628 to a logical one. However, if the receiving buffer becomes empty before the BSM is generated, the CFR 320B will be reset 630 to a logical zero to indicate that the receiving buffer is empty. As described above, the contents of the NMTSR 318B and, possibly, the CFR 320B are included in the BSM. A more detailed discussion of the transmitting and receiving of BSMs is described below with reference to FIGS. 7–9.

Figure 7:
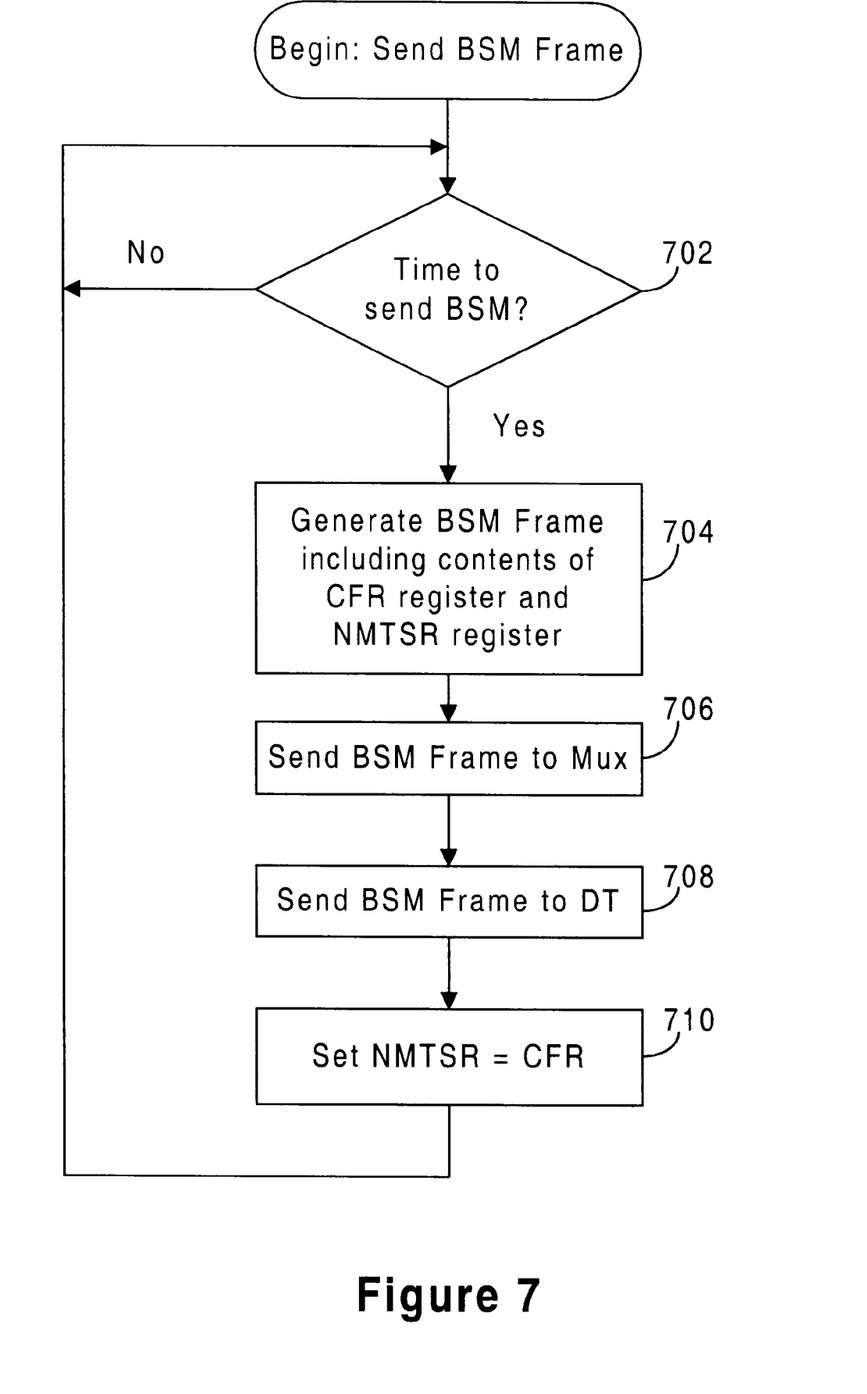
FIG. 7 is a flow diagram of a buffer status message generation and transmission technique according to a preferred embodiment of the present invention.

FIG. 7 is a flow diagram of a buffer status message generation and transmission technique according to a preferred embodiment of the present invention. The flow control transmitter 305B transmits a BSM whenever data frames are not being transmitted from the second router 104B to the first router 104A, i.e., when frames are being transmitted in the opposite direction from what is described in the above example. If the flow of data in this opposite direction is heavy, then a BSM may not be sent until after all data frames have been sent. However, there are situations when it is important for the flow control transmitter 305B to immediately transmit a BSM to the flow control receiver 304A. One example of this situation is when a buffer becomes available in the port 6 buffer array 322B. It may be important that the flow control receiver 304A receive a BSM that indicates that a buffer has become available because, for example, there may be frames stored in buffer arrays 322 in the first router 104A that are waiting for enough buffers to become available in the port 6 buffer array 322B such that the frame may be transmitted. For example, if the information in the flow control receiver 304A indicates that only two buffers are available in the port 6 buffer array 322B, then no frames having a low priority can be sent from the first router 104A to port 6 202B of the second router 104B if the priority protocol described above is utilized. When a third buffer becomes available in the port 6 buffer array 322B, this information can be transmitted to the flow control receiver 304A in the form of a BSM. In order to immediately transmit a BSM, the flow control transmitter sends a signal to arbiter 6 204B in the second router 104B that requests that a BSM be transmitted as soon as possible. Arbiter 6 204B generates a signal that controls the MUX 328B on the second router 104B. In response to this signal, the MUX 328B can multiplex the BSM on the signal line 212 after, for example, the currently transmitting frame has been completely transmitted.

If it is time to send a BSM 702, then the BSM generator 316B generates 704 a BSM. As described above, the contents of the BSM can be either the NMTSR 318B or both the NMTSR 318B and the CFR 320B. The contents of the NMTSR 318B are equal to the contents of the CFR 320B at the time of the previous BSM with the exception that if the value of the CFR 320B was a logical zero and some data was received in the buffer since the previous BSM was sent, then the value in the NMTSR 318B associated with the buffer is set equal to a logical one to indicate that the frame was received, as described above. The flow control transmitter 305B transmits 706 the BSM to the MUX 328B. The MUX 328B then transmits 708 the BSM to the first router 104A. After transmitting 706 the BSM frame to the MUX 328B, the flow control transmitter 305B sets 710 the NMTSR 318B equal to the CFR 320B.

Figure 8:
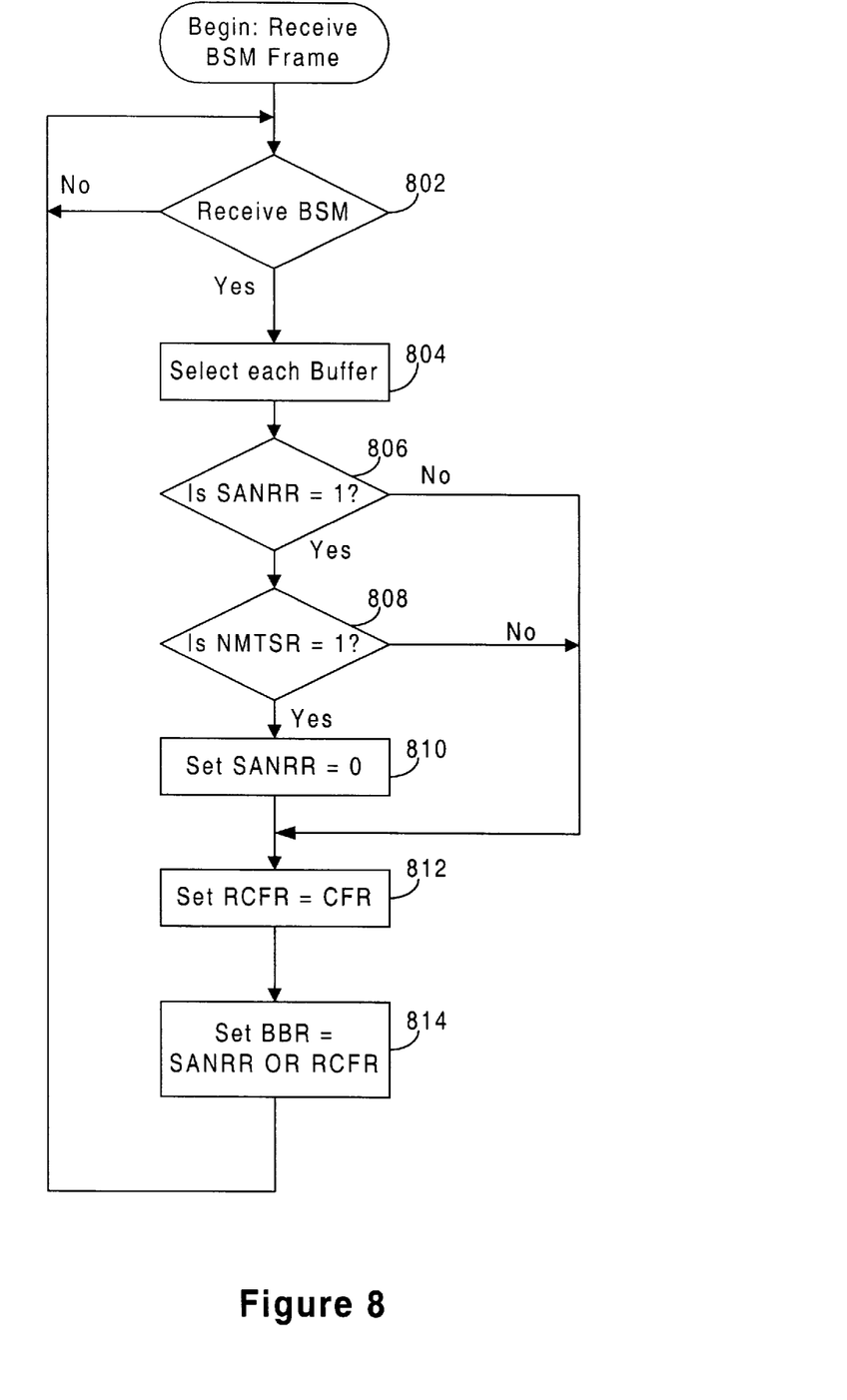
FIG. 8 is a flow diagram of a buffer status message receiving technique according to a preferred embodiment of the present invention.

FIG. 8 is a flow diagram of a buffer status message receiving technique according to a preferred embodiment of the present invention. The data synchronizer 324A receives the BSM, determines 802 that the BSM is a buffer status message and not a data frame, and transmits the BSM to the flow control receiver 304A. The flow control receiver 304A selects 804 each buffer and performs the remaining steps in FIG. 8 in parallel for each buffer. The BSM receiver 306A in the flow control receiver 304A determines 806 if the bit associated with each buffer in the SANRR 308A is equal to a logical one. If SANRR 308A is equal to a logical one, then the BSM receiver 306A determines 808 if the bit associated with each buffer in the NMTSR 318B portion of the BSM is equal to a logical one. If NMTSR=1, then SANRR 308A is set 810 equal to a logical zero and the process continues at step 812. If the value in SANRR 308A is equal to a logical zero or if the value of NMTSR 318B is equal to a logical zero then the process continues at step 812. In step 812 each bit in the RCFR 310A is set 812 equal to the associated bit in the CFR 320B if the BSM represents both the NMTSR 318B and the CFR 320B. If the BSM represents only the NMTSR 318B, the BSM receiver 306A sets 812 the RCFR 310A equal to the associated bit in the NMTSR 318B portion of the BSM. The BSM receiver 306A then sets 814 each bit in the BBR 312A equal to the logical OR of the associated bit in the SANRR 308A and the RCFR 310A.

Figure 9:
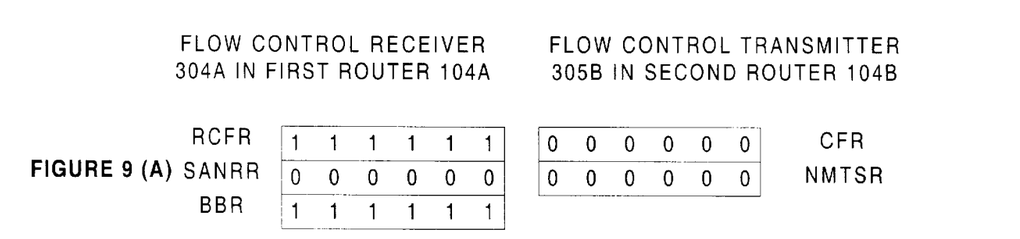
FIGS. 9(a)–9(g) are examples of register values according to a preferred embodiment of the present invention.

FIGS. 9(*a*)–9(*g*) are examples of register values according to a preferred embodiment of the present invention. In FIG. 9, the three registers labeled RCFR 310A, SANRR 308A, and BBR 312A, correspond to the values of these registers in the flow control receiver 304A in the first router 104A when frames are sent from the first router 104A to the second router 104B. The two registers labeled CFR 320B and NMTSR 318B correspond to the values of these registers in the flow control transmitter 305B in the second router 104B when frames are sent from the first router 104A to the second router 104B. FIG. 9(*a*) illustrates the values of the registers when the routers 104 are initialized. As indicated in the state diagrams in FIG. 4 and FIG. 5, the values in the RCFR 310A and BBR 312A are set equal to a logical one while the values in the remaining registers are set equal to a logical zero. The flow control transmitter 305B generates a first BSM and transmits it to the flow control receiver 304A, as described above. The values of the registers after receiving the first BSM is shown in FIG. 9(*b*). The first BSM is equal to either BSM=0,0 or BSM=0, depending upon the size of the first BSM. In either situation, the registers in the flow control receiver 304A transition from state III to state I. The remaining portion of this example involves the first buffer in the port 6 buffer array 322B, or the buffer associated with the tag 001, as described above. The first router 104A transmits a frame to the second router 104B. The status of the registers after the frame transmission is shown in FIG. 9(*c*). In FIG. 9(*c*), the SANRR 308A is set equal to a logical one because the first router 104A has sent a frame but has not received an acknowledge signal. Since the SANRR 308A is set to a logical one, the BBR 312A is also set equal to a logical one.

After the frame has been received by the port 6 buffer array 322B, and the flow control transmitter has updated the NMTSR 318B and the RCFR 320B, the values of the register values are shown in FIG. 9(*d*). In FIG. 9(*d*), the values of the SANRR 308A, RCFR 310A, and the BBR 312A have not changed because no BSM was received by the flow control receiver 304A. However, the first bit in the NMTSR 318B is equal to a logical one because data was received by the port 6 buffer array 322B since the first BSM was sent. Since the first buffer is not empty, the first bit in the CFR 320B is also set equal to a logical one. However, before a second BSM is transmitted, the frame is transmitted to the third router 104E and the first buffer becomes empty. Therefore, the value of the CFR 320B when the second BSM is generated is equal to a logical zero. This is shown in FIG. 9(*e*). When the register values are as shown in FIG. 9(*e*), the flow control transmitter 305B generates and transmits a second BSM. If the second BSM includes both the NMTSR 318B and the CFR 320B, the values of the registers in the flow control receiver 304A after receiving the second BSM are shown in FIG. 9(*g*). In FIG. 9(*g*) the value of all bits in the SANRR 308A, RCFR 310A, and BBR 312A are equal to a logical zero. The values of the registers in the flow control transmitter 305B are also all equal to a logical zero because the value of the CFR 320B is stored in the NMTSR 318B. This is equivalent to the registers in the flow control receiver 304A transitioning from state II to state I in FIG. 4. If the second BSM includes only the NMTSR 318B, the value of the register after the flow control receiver 304A receives the second BSM is shown in FIG. 9(*f*). This is equivalent of the registers in the flow control receiver 304A transitioning from state II to state III in FIG. 5. At a later time, the flow control transmitter 305B will generate and transmit a third BSM that includes only the NMTSR 318B values. After receiving the third BSM, the values of the registers are as shown in FIG. 9(*g*). This is equivalent of the registers in the flow control receiver 304A transitioning from state III to state I in FIG. 5.

What is claimed is:

1. In a computer network, a method for optimizing a transmission of data from a first network element having a first flag to a second network element having a receiving buffer and a second flag, comprising the steps of:

(a) initializing the first flag to an initial value in response to the computer network being initialized;

(b) modifying the initial value of the first flag to a first value if the receiving buffer being available to receive data;

(c) transmitting data from said first network element to said second network element in response to the value of said first flag being equal to the first value;

(d) setting the first flag to a second value indicating that the receiving buffer is in a full state and is not available to receive data from a first network element independent of when the receiving buffer actually receives the data;

(e) receiving the data in the receiving buffer;

(f) setting the second flag to said first value in response to the receiving buffer having received the data and the receiving buffer is available to receive data;

(g) generating a control signal having a value equal to the value of the second flag;

(h) transmitting said control signal from said second network element to said first network element; and (i) setting the first flag equal to the value of said control signal.

2. The method of claim 1, further comprising the step of: repeating steps.

3. The method of claim 1, wherein the computer network is a source node routing network having all network routing information determined in a data transmitting element.

4. The method of claim 1, wherein said first network element and said second network element are routers.

5. The method of claim 1, wherein step further comprises the steps of:

setting a first register equal to a third value indicating that the first network element has transmitted data to the second network element and has not received a control signal indicating that the data was received by the second network element; and setting said first flag to said second value when said first register is equal to said third value.

6. The method of claim 5, wherein step further comprises the steps of:

setting a second register to a fourth value indicating that the second network element has received the data sent by the first network element;

setting a third register to a fifth value indicating that the buffer is available to receive data; and setting the second flag to said first value if said second register is equal to said fourth value and said third register is equal to said fifth value.

7. The method of claim 6, further comprising the step of:

setting said third register to a sixth value indicating that the buffer is not available to receive data.

8. The method of claim 7, further comprising the step of:

setting the second flag equal to said second value if said second register is equal to said fourth value and said third register is equal to said sixth value.

9. The method of claim 8, wherein step further comprises the steps of:

setting said first register to an eighth value indicating that the second network element received the data sent by the first network element if said second flag is equal to said second value;

setting a fourth register to a seventh value if said second flag is equal to said second value.

10. The method of claim 1, wherein step further comprises the steps of:

transmitting said control signal to an input of a multiplexer in the second network element;

generating a first signal having a third value when one of no data is being transmitted from the second network element to the first network element and the control signal has a higher priority than data being transmitted from the second network to the first network;

transmitting said control signal from said second network element to the first network element if said first signal has said third value; and transmitting said data from said second network element to the first network element if said first signal does not have said third value.

11. The method of claim 1, wherein the interaction between the first and second flags via the control signal is accomplished asynchronously thereby reducing network latency.

12. A method for optimizing a transmission of data from a first network element having a first flag to a second network element having a receiving buffer and a second flag, in a computer network, comprising the steps of:

(a) initializing the first flag to an initial value in response to the computer network being initialized;

(b) modifying the initial value of the first flag to a first value if the receiving buffer being available to receive data;

(c) transmitting data from said first network element to said second network element in response to said first flag being equal to a first value indicating that said receiving buffer is available to receive data;

(d) setting the first flag to a second value indicating that the receiving buffer is in a full state and is not available to receive data from said first network element independent of when the receiving buffer actually receives the data;

(e) receiving the data in the receiving buffer;

(f) setting the second flag to said second value in response to the receiving buffer having received the data;

(g) generating a control signal having a value equal to the value of the second flag;

(h) transmitting said control signal from said second network element to said first network element;

(i) setting the first flag equal to the value of said control signal;

(j) setting the second flag to said first value in response to the second flag being equal to said second value and the buffer is available to receive data;

(k) generating said control signal having a value equal to the value of the second flag;

(l) transmitting said control signal from said second network element to said first network element; and (m) setting the first flag equal to the value of said control signal.

13. The method of claim 12, further comprising the step of:

repeating steps.

14. The method of claim 12, wherein the computer network is a source node routing network having all network routing information determined in a transmitting element.

15. The method of claim 12, wherein said first network element and said second network element are routers.

16. The method of claim 12, wherein step further comprises the steps of:

setting a first register equal to a third value indicating that the first network element has transmitted data to the second network element and has not received a control signal indicating that the data was received by the second network element; and setting said first flag to said second value when said first register is equal to said third value.

17. The method of claim 12, wherein the interaction between the first and second flags via the control signal is accomplished asynchronously thereby reducing network latency.

18. A system for optimizing a transmission of data in a computer network, the system comprising:

a first network element having a first flag; and a second network element, coupled to said first network element, having a receiving buffer and a second flag;

wherein said first network element includes:

a first transmitting unit for transmitting data from said first network element if a value of said first flag is equal to a first value indicating that said receiving buffer is available to receive data; and a first buffer status unit, coupled to said first transmitting unit, for setting said first flag to one of a second value after data is transmitted from the first network element thereby indicating that the receiving buffer is in a full state and is not available to receive data from the first network element independent of when the receiving buffer actually receives the data and a first value thereby indicating that the receiving buffer is available to receive data; and wherein said second network element includes:

a receiving element, coupled to said first transmitting unit, for receiving the data transmitted from the first network element;

a second buffer status unit, coupled to said receiving buffer and coupled to said receiving element, for setting the second flag to said first value if the receiving buffer has received the data and the receiving buffer is available to receive data;

a control signal generator, coupled to said second buffer status unit, for generating a control signal having a value equal to the value of the second flag; and a second transmitting unit, coupled to said control signal generator, for transmitting said control signal from said second network element to said first network element.

19. The system of claim 18, wherein the computer network is a source node routing network having all network routing information determined in a data transmitting element.

20. The system of claim 18, wherein said first network element and said second network element are routers.

21. The system of claim 18, wherein the interaction between the first and second flags via the control signal is accomplished asynchronously thereby reducing network latency.

22. A method for optimizing a transmission of data from a first network element having a first flag to a second network element having a receiving buffer and a second flag, in a computer network, comprising the steps of:

(a) initializing the first flag to an initial value in response to the computer network being initialized;

(b) modifying the initial value of the first flag to a first value if the receiving buffer being available to receive data;

(c) determining if a value of the first flag is equal to a first value indicating that said receiving buffer is available to receive data;

(d) transmitting data from said first network element to said second network element if said value of the first flag is equal to said first value;

(e) setting the first flag in said first network to a second value indicating that the receiving buffer is in a full state and is not available to receive additional data from said first network element independent of when the receiving buffer actually receives the data;

(f) receiving the data in the receiving buffer;

(g) setting the second flag to a third value if the receiving buffer has received the data and the receiving buffer is available to receive data;

(h) setting the second flag to a fourth value if one of the receiving buffer has not received the data and the receiving buffer is not available to receive data;

(i) generating a control signal, said control signal including the value of the second flag;

(j) transmitting said control signal from said second network element to said first network element; and (k) setting the first flag to a value based upon the value of said control signal.

23. The method of claim 22, wherein step further comprises the steps of:

transmitting said control signal to an input of a multiplexer in the second network element;

transmitting said control signal to said first network element when one of no data is being transmitted from the second network element to the first network element and the control signal has a higher priority than second data being transmitted from the second network to the first network.

24. The method of claim 23, wherein step further comprises the step of:

transmitting said second data from said second network element to the first network element if said control signal does not have a higher priority than said data.

25. The method of claim 22, further comprising the step of:

repeating steps.

26. The method of claim 22, wherein the computer network is a source node routing network having all network routing information determined in a data transmitting element.

27. The method of claim 22, wherein said first network element and said second network element are routers.

28. The method of claim 22, wherein the interaction between the first and second flags via the control signal is accomplished asynchronously thereby reducing network latency.

* * * * *